(12) United States Patent
Fuglsang et al.

(10) Patent No.: US 8,944,775 B2
(45) Date of Patent: Feb. 3, 2015

(54) WIND TURBINE BLADE HAVING A SPOILER WITH EFFECTIVE SEPARATION OF AIRFLOW

(75) Inventors: Peter Fuglsang, Vejle (DK); Kaja Lenz, Sønderborg (DK)

(73) Assignee: LM Glasfiber A/S, Kolding (DK)

( * ) Notice: Subject to any disclaimer, the term of this patent is extended or adjusted under 35 U.S.C. 154(b) by 516 days.

(21) Appl. No.: 13/139,153

(22) PCT Filed: Oct. 26, 2009

(86) PCT No.: PCT/EP2009/064085
§ 371 (c)(1),
(2), (4) Date: Jun. 10, 2011

(87) PCT Pub. No.: WO2010/066501
PCT Pub. Date: Jun. 17, 2010

(65) Prior Publication Data
US 2011/0250076 A1    Oct. 13, 2011

(30) Foreign Application Priority Data
Dec. 12, 2008   (EP) ..................................... 08171530

(51) Int. Cl.
*F03B 3/12* (2006.01)
*F03D 1/06* (2006.01)

(52) U.S. Cl.
CPC ............ *F03D 1/0641* (2013.01); *F03D 1/0675* (2013.01); *F05B 2200/263* (2013.01); *F05B 2240/301* (2013.01); *F05B 2250/712* (2013.01); *Y02E 10/721* (2013.01)
USPC ...................................................... 416/237

(58) Field of Classification Search
CPC ... Y02E 10/721; F03D 1/0641; F03D 1/0675; F03D 11/00; F03D 1/0633; F03D 1/0608; F03D 1/0658; F05B 2240/301; F05B 2240/30

USPC ....... 416/237, 242, 223 R, 235, 236 R, 231 A
See application file for complete search history.

(56) References Cited

U.S. PATENT DOCUMENTS 6,910,867 B2 * 6/2005 Corten ...................... 416/223 R
2004/0013512 A1 * 1/2004 Corten ........................... 415/4.1

FOREIGN PATENT DOCUMENTS

EP          1 845 258 A1    10/2007
WO         02/08600 A1       1/2002
(Continued)

OTHER PUBLICATIONS

International Search Report for International Application No. PCT/EP2009/064085, with a mailing date of Nov. 26, 2009.

*Primary Examiner* — Edward Look
*Assistant Examiner* — Eldon Brockman
(74) *Attorney, Agent, or Firm* — Nath, Goldberg & Meyer; Jerald L. Meyer; Sanjana Mangalagiri (57) ABSTRACT

A wind turbine blade with a flow guiding device attached to a profiled contour on a pressure side of the blade is described. The flow guiding device extends along at least a longitudinal part of a transition region of the blade and is arranged so as to generate a separation of airflow along at least a central longitudinal portion of the flow guiding device from the pressure side of the blade at a point between the flow guiding device and a trailing edge of the blade, when the blade is impacted by an incident airflow. The inflow surface, in at least the central longitudinal portion, is formed so that, for each transverse cross-section, a end point tangent to the inflow surface at the end point crosses the profiled contour at a crossing point, where the profiled contour has a profile tangent to the profiled contour, and wherein an angle between the profile tangent and the end point tangent is at least 45 degrees.

22 Claims, 6 Drawing Sheets

(56) References Cited

FOREIGN PATENT DOCUMENTS

| WO | 2007/045244 | A1 | | 4/2007 |
| WO | 2007/065434 | A1 | | 6/2007 |
| WO | 2007/114698 | A2 | | 10/2007 |
| WO | 2007/118581 | A1 | | 10/2007 |
| WO | WO 2007138136 | A1 | * | 12/2007 |
| WO | 2008/113350 | A2 | | 9/2008 |

* cited by examiner

WIND TURBINE BLADE HAVING A SPOILER WITH EFFECTIVE SEPARATION OF AIRFLOW

This is a National Phase Application filed under 35 U.S.C. §371 as a national stage of PCT/EP2009/064085, filed on Oct. 26, 2009, an application claiming the benefit under 35 U.S.C. §119 of European Patent Application No. 08171530.2, filed on Dec. 12, 2008, the content of each of which is hereby incorporated by reference in its entirety.

The present invention relates to a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, wherein the blade further comprises: a profiled contour including a pressure side and a suction side, as well as a leading edge and a trailing edge with a chord having a chord length extending there between, the profiled contour when being impacted by an incident airflow generating a lift, wherein the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region.

Ideally, a wind turbine blade of the airfoil type is shaped like a typical aeroplane wing, where the chord plane width of the blade as well as the first derivative thereof increase continuously with decreasing distance from the hub. This results in the blade ideally being comparatively wide in the vicinity of the hub. This again results in problems when having to mount the blade to the hub, and, moreover, this causes great loads during operation of the blade, such as storm loads, due to the large surface area of the blade.

Therefore, over the years, the construction of blades has developed towards a shape, where the blade consists of a root region closest to the hub, an airfoil region comprising a lift-generating profile furthest away from the hub and a transition region between the root region and the airfoil region. The airfoil region has an ideal or almost ideal blade shape with respect to generating lift, whereas the root region has a substantially circular cross-section, which reduces the storm loads and makes it easier and safer to mount the blade to the hub. The root region diameter is preferably constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the blade in the transition region increases substantially linearly with increasing distance from the hub.

As for instance blades for wind turbines have become bigger and bigger in the course of time and may now be more than 60 meters long, the demand for optimised aerodynamic performance has increased. The wind turbine blades are designed to have an operational lifetime of at least 20 years. Therefore, even small changes to the overall performance of the blade may over the lifetime of a wind blade accumulate to a high increase in financial gains, which surpasses the additional manufacturing costs relating to such changes. The focus areas for research have in many years been directed towards improving the airfoil region of the blade, but during the recent few years, more and more focus has been directed towards improving the aerodynamic performance of the root region and the transition region of the blade also.

WO2007/065434 discloses a blade wherein the root region is provided with indentations and/or projections in order to decrease the drag from this part of the blade.

WO2007/045244 discloses a blade, wherein the root region and the transition region is designed so as to have at least two separate airfoil profiles in order to increase the lift of these regions.

WO2007/118581 discloses a blade, where the inboard part of the blade is provided with a flow guiding device on the pressure side of the blade in order to delay separation of the airflow and increasing the aerodynamic performance of the blade.

EP 1 845 258 discloses a blade having a Gurney flap like device arranged in the transition portion of the blade. The Gurney flap like device has a concave curvature and is arranged at the trailing edge on the pressure side of the blade.

It is an object of the invention to obtain a new blade, and which overcomes or ameliorates at least one of the disadvantages of the prior art or which provides a useful alternative.

According to a first aspect of the invention, the blade is provided with a flow guiding device added to the profiled contour of the blade on the pressure side of the blade, the flow guiding device having an inflow surface with a start point oriented towards the leading edge of the blade and an end point oriented towards the trailing edge of the blade, the distance between the inflow surface and the profiled contour increasing from the start point to the end point, and wherein the flow guiding device extends along at least a longitudinal part of the transition region and is arranged so as to generate a separation of airflow along at least a central longitudinal portion of the flow guiding device from the pressure side of the blade at a point between the flow guiding device and the trailing edge of the blade, when the blade is impacted by the incident airflow, and wherein the inflow surface in at least the central longitudinal portion is formed so that, for each transverse cross-section, an end point tangent to the inflow surface at the end point crosses the profiled contour at a crossing point, where the profiled contour has a profile tangent to the profiled contour, and wherein an angle between the profile tangent and the end point tangent is at least 45 degrees.

The flow guiding device is mounted to the inboard part of the blade, i.e. the part nearest the hub, and particularly to the transition region of the blade. The power produced from this part of the blade is very poor, but attaching a flow guiding device according to the invention increases the lift significantly on this section of the blade at the governing inflow angles for this section. The flow guiding device functions as an obstruction to the flow on the pressure side of the profile. This obstruction is resulting in a higher pressure after the flow guiding device, i.e. between the flow guiding device and the trailing edge of the wind turbine blade, due to a detachment of the flow. After the flow guiding device, i.e. between the flow guiding device and the trailing edge of the blade, a separation of the airflow occurs. Therefore, the increase of the "release angle" of the airflow also increases the drag of the particular blade segment significantly. However, experiments have surprisingly shown that the flow guiding device according to the invention, despite the increase in drag, improves the overall lift-to-drag ratio with at least 5% within the longitudinal extent of the flow guiding device compared to conventional flow guiding devices, where said angle is substantially less than 45 degrees. The increase in lift-to-drag ratio improves the overall performance of the wind turbine rotor and the increase in lift alone reduces the local inflow angle, thereby somewhat limiting the size of the separated flow region on the suction side. A realistic estimate of the potential performance improvement is 1-1.5% of annual energy yield compared to conventional wind turbine blades without such flow guiding devices. When seen over the lifetime of a wind turbine rotor this provides a substantial economical benefit compared to the additional manufacturing costs relating to the manufacturing of blades with such flow guiding devices.

It should be noted that the end point tangent and the profile tangent form more than one angle. From the following detailed description, it is clear that the angle referred to is the angle between the exterior part of the end point tangent and the part of the profile tangent, which extends towards the trailing edge of the blade. In other words, the angle referred to is located in a quadrant external to the blade profile nearest the trailing edge of the blade. The two tangents form an acute angle and an obtuse angle (except for when they are mutually perpendicular). Thus, it is clear that it is the acute angle, which is at least 45 degrees.

According to an advantageous embodiment, the angle between the profile tangent and the end point tangent is at least 50 degrees, or at least 55 degrees, or at least 60 degrees. The angle may be up to 90 degrees. Preferably, the angle lies in an interval between 60 to 90 degrees, which surprisingly has found to provide the best efficiency despite the high degree of separation and increased drag. The lift-to-drag ratio has been found to be substantially constant within said interval.

According to another advantageous embodiment, a median line to the inflow surface forms a second angle with the chord, the second angle being at least 25 degrees, or at least 30 degrees, or at least 35 degrees. The second angle may be a supplementary design parameter to the angle between the end point tangent and the profile tangent, or it may be an alternative design parameter. According to an advantageous embodiment, the inflow surface is substantially aligned along a line forming an angle to the chord being at least 25 degrees, or at least 30 degrees, or at least 35 degrees. Accordingly, the end point tangent may also form an angle to the chord being at least 25 degrees, or at least 30 degrees, or at least 35 degrees, if the inflow surface is straight.

The median line corresponds to a linear fitted line to the inflow surface or an average tangent to the inflow surface. Thus, it is seen that the inflow surface on average forms a second angle of at least 25 degrees with the chord. Again, it should be noted that the second angle refers to the acute angle formed between the median line and the chord.

According to another advantageous embodiment, the flow guiding device extends along substantially the entire longitudinal length of the transition region. Thereby, the lift and the lift-to-drag ratio are improved for substantially the entire aerodynamically non-ideal transition region.

In a preferred embodiment according to the invention, the central longitudinal portion is at least 50%, 60%, 70%, 80%, or 90% of the longitudinal extent of the flow guiding device.

The inflow surface may be substantially straight, i.e. the flow guiding device has a cross-section, which is substantially wedge-shaped. According to an alternative embodiment, the blade inflow surface is concave.

According to one embodiment, a starting point tangent to the profiled inflow surface at the starting point is substantially parallel to a tangent to the profile at the starting point. Thereby, the profile has a smooth surface transition to the inflow surface of the flow guiding device.

According to one advantageous embodiment, the flow guiding device has a width, wherein the ratio between the width and the chord length decreases in the longitudinal direction towards the tip end. This can for instance be obtained by the width being substantially constant in the longitudinal direction of the blade, since the chord length is increasing in the transition region. However, the width may also decrease in the longitudinal direction of the blade.

In one embodiment according to the invention, the start point in at least the central longitudinal portion is arranged in an area between 55% and 88% of the chord length, or between 57% and 87%, or between 60% and 85%, seen from the leading edge of the blade. In another embodiment according to the invention, the end point in at least the central longitudinal portion is arranged in an area between 70% and 90% of the chord length, or between 75% and 88%, or between 80% and 87% from the leading edge of the blade.

In yet another embodiment according to the invention, the distance between the end point and the trailing edge of the blade increases in the longitudinal direction towards the tip end of the blade.

According to a preferred embodiment, the blade is manufactured partly as a shell construction made of a fibre reinforced polymer material.

In one advantageous embodiment, the flow guiding device is integrally formed with the blade. Accordingly, the flow guiding device may be manufactured together with the blade, via for instance a moulding process, such as a VARTM process. In this case, the profiled contour is to be conceived as an imaginary smooth, continuous surface extending from the start point of the inflow surface to a second point near the end point of the inflow surface. In another advantageous embodiment, the flow guiding device is fitted on the surface of the blade. Thus, the blade and the flow guiding device may be manufactured separately, and the flow guiding device be fitted to the surface of the blade afterwards. Thereby, the moulding surface of the mould for manufacturing the blade may have a much simpler form without any discontinuities. This lowers the probability of the blade surface sticking to the moulding surface and thus being damaged, when the blade is to be removed from the mould after curing. According to yet another advantageous embodiment, the flow guiding device may be actively emerged from or be retracted to the profiled contour. The flow guiding device may be actively controlled so that depending on the operational conditions, the blade may function with or without the flow guiding device protruding from the profiled contour of the blade.

As previously mentioned, the flow guiding device preferably extends along substantially the entire longitudinal extent of the transition region of the blade. However, the flow guiding device may also extend into the root region.

According to one embodiment, the flow guiding device has a rear edge with a rear edge height, and wherein the rear edge height in at least the central longitudinal portion of the flow guiding device decreases in the longitudinal direction towards the tip end. Thereby, a particular simple shape having a smooth transition from the transition region to the airfoil region of the blade is obtained, and where the ratio between the rear edge height and the profile thickness optionally may be kept substantially constant.

According to another embodiment, the flow guiding device has a rear edge with a rear edge height, and wherein the rear edge height is substantially constant in at least the central longitudinal portion of the flow guiding device. The rear edge height may be decreasing from the central longitudinal portion to the longitudinal ends of the flow guiding devices in order to obtain a smooth transition to the profiled contour near the longitudinal ends of the flow guiding device. The rear edge height corresponds to the distance between the end point and the profiled contour in a direction perpendicular to the chord.

According to an advantageous embodiment, the flow guiding device has a rear edge with a rear edge height, and the profiled contour has a maximum thickness, wherein the ratio between the rear edge height and the maximum thickness in at least the central longitudinal portion lies in an interval between 3% and 25%, or between 5% and 25%, or between 3% and 20%, or between 5% and 20%, or even between 10% and 20%. Although, such heights also provides for a high degree of separation of airflow from the profiled contour, thus causing a substantial increase in drag, such rear edge heights has shown to provide excellent results.

The rear edge of the flow guiding device may be pointing backwards towards the trailing edge of the blade or forward towards the leading edge of the blade. The rear edge may be concave, straight or convex.

According to an advantageous embodiment of the blade, the blade is designed for operation with an angle of attack of 15 to 20 degrees in the central longitudinal portion of the transition region.

The flow guiding device can be designed in different ways. For instance it may be formed as a rib, a triangular shape or a slightly curved shape. Along the longitudinal direction, the flow guiding device may change its shape and chordal position. According to an advantageous embodiment, the flow guiding device is a spoiler device.

According to another advantageous embodiment, the blade is further provided with vortex generators at the transition region and/or root region of the blade. When vortex generators are optimally positioned together with the flow guiding device, this provides for an even better performance of particularly the blade root area.

The invention is explained in detail below with reference to an embodiment shown in the drawings, in which.

Figure 1:
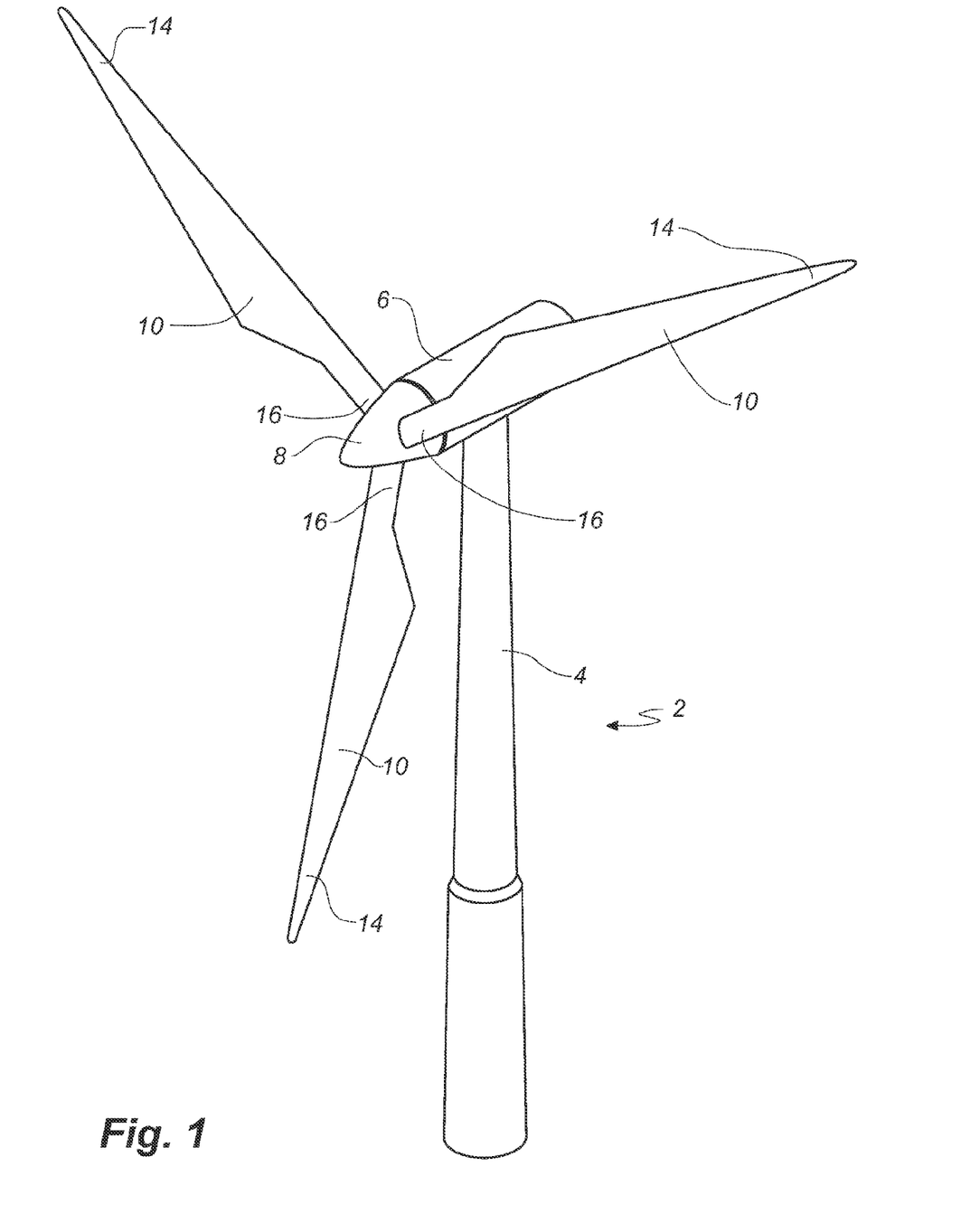
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 3:
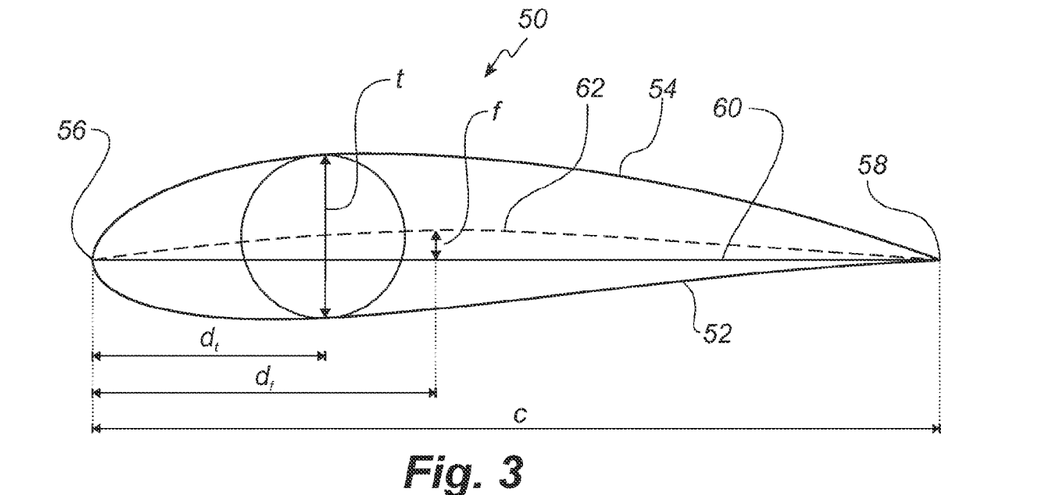
FIG. 3 shows a schematic view of an airfoil profile.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Figure 2:
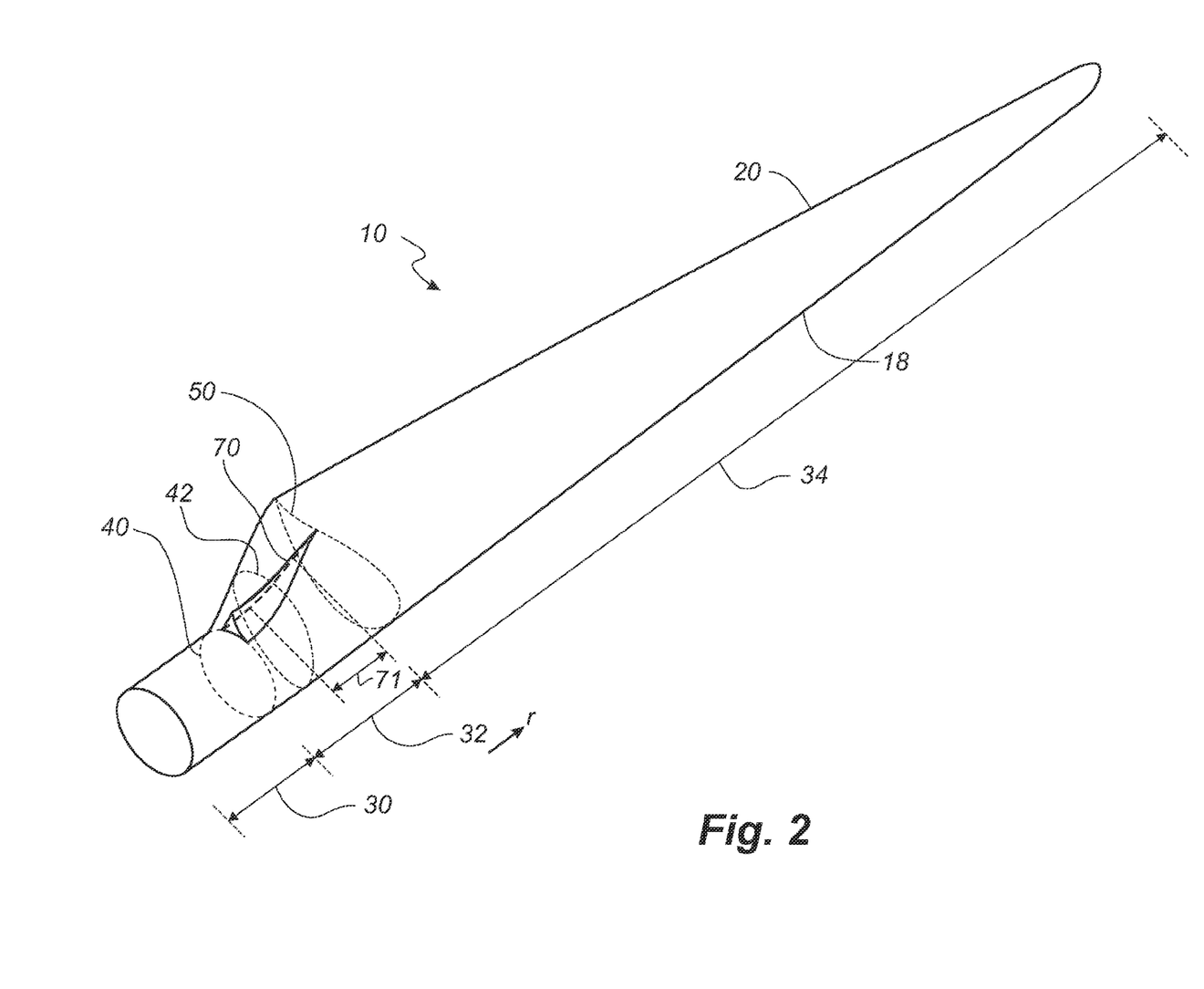
FIG. 2 shows a schematic view of a first embodiment of a wind turbine blade provided with a flow guiding device according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 according to the invention is provided with a flow guiding device 70, which protrudes from the pressure side of the blade in the transition region 32 of the blade.

Figure 4:
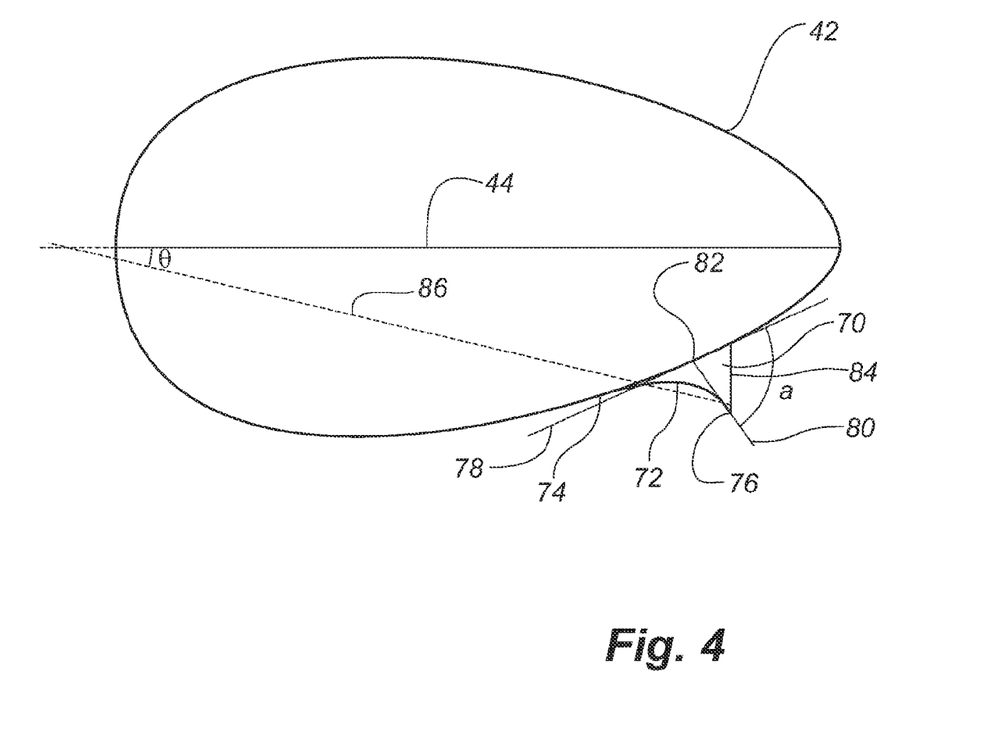
FIG. 4 shows a cross section of a wind turbine blade according to the invention.

FIG. 4 shows a cross section of the wind turbine blade 10 in the transition region 32. The wind turbine in this region comprises a profiled contour with a transitional profile 42, which gradually changes from the circular profile 40 of the root region 32 to the airfoil profile 50 of the airfoil region. The transitional profile is from an aerodynamic point of view non-ideal. It can be seen that the profile has a smooth shape, from which the flow guiding device 70 protrudes on the pressure side of the blade. The flow guiding device 70 comprises an inflow surface 72 with a start point 74, where the inflow surface 72 continues over to the profiled contour 42 of the blade, and an end point 76, where the flow detaches from the profile. The start point 74 can also be conceived as a point of attachment for the flow guiding device 70, if the flow guiding device is retrofitted to the surface of the blade 10. The flow guiding device 70 further comprises a rear edge 84, which extends from the end point 76 to the profiled contour 42 of the blade 10. The distance between the inflow surface 72 of the flow guiding device 70 and the profiled contour 42 increases towards the trailing edge of the blade, so that the flow guiding device has a wedge-like shape. The inflow surface 72 may be substantially straight or it may be slightly curved as shown in FIG. 4.

The inflow surface 72 is formed so that, for each transverse cross-section in at least a central longitudinal portion 71 of the transition region 32, an end point tangent 80 to the inflow surface 72 at the end point 76 crosses the profiled contour 42 at a crossing point 82, where the profiled contour 42 has a profile tangent 78 to the profiled contour. The end point tangent 80 and the profile tangent 78 form a mutual crossing angle a. It should be noted that the end point tangent and the profile tangent form more than one angle. From the following detailed description, it is clear that the angle a is the angle between the exterior part of the end point tangent and the part of the profile tangent, which extends towards the trailing edge of the blade. In other words, the angle a is located in a quadrant external to the blade profile nearest the trailing edge of the blade. The two tangents 78, 80 form an acute angle and an obtuse angle (except for when they are mutually perpendicular). Thus, it is clear from the description that it is the acute angle, which is at least 45 degrees.

Further, another design parameter may be used for the design of the flow guiding device 70, and in particular the shape of the inflow surface 72, viz. a second angle θ, which is the angle between a median line 86 to the inflow surface 72 of the flow guiding device 70 and a chord 44 to the profiled contour 42.

The flow guiding device 70 functions as an obstruction to the flow on the pressure side of the profile. This obstruction results in a higher pressure after the flow guiding device 70, i.e. between the flow guiding device 70 and the trailing edge of the wind turbine blade, due to detachment of the flow from the surface. After the flow guiding device 70, i.e. between the flow guiding device and the trailing edge of the blade 70, a separation of the airflow occurs.

When the angle a is at least 45 degrees, experiments have shown that the lift-to-drag ratio of a cross section of the transition region 32 can be increased significantly compared to prior art blades with similar flow guiding devices. This is unexpected, since the degree of separation and thus the induced drag on the profile increase significantly due to the larger "release angle" of airflow from the flow guiding device. Experiments have shown that even greater angles from 60 degrees and up to 90 degrees provide even further improvements to the lift-to-drag ratio.

Figure 7:
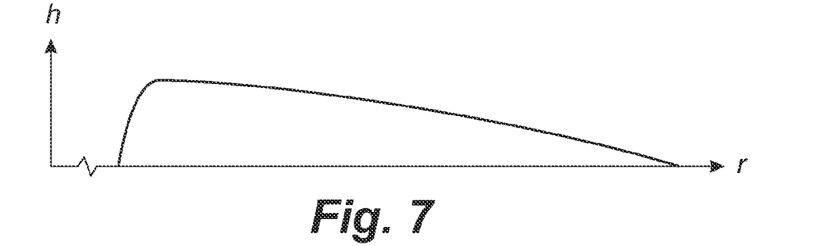
FIG. 7 shows the rear edge height of a second flow guiding device according to the invention as a function of the radial distance from the hub.

In the first embodiment, the height h of the rear edge 84 of the flow guiding device is in FIG. 2 and FIG. 7 seen to be decreasing in the longitudinal direction (or radial distance from the hub) towards the tip end r of the blade. The height of the rear edge 84 is shown as a function of the radial distance r from the hub in FIG. 7. At the longitudinal end of the flow guiding device 70 nearest the hub, the flow guiding device 70 is rounded or tapered in order to obtain a smooth transition to the profiled contour of the blade. The rear edge height h corresponds to the distance between the end point of the flow guiding device and the profiled contour in a direction perpendicular to the chord.

Figure 5:
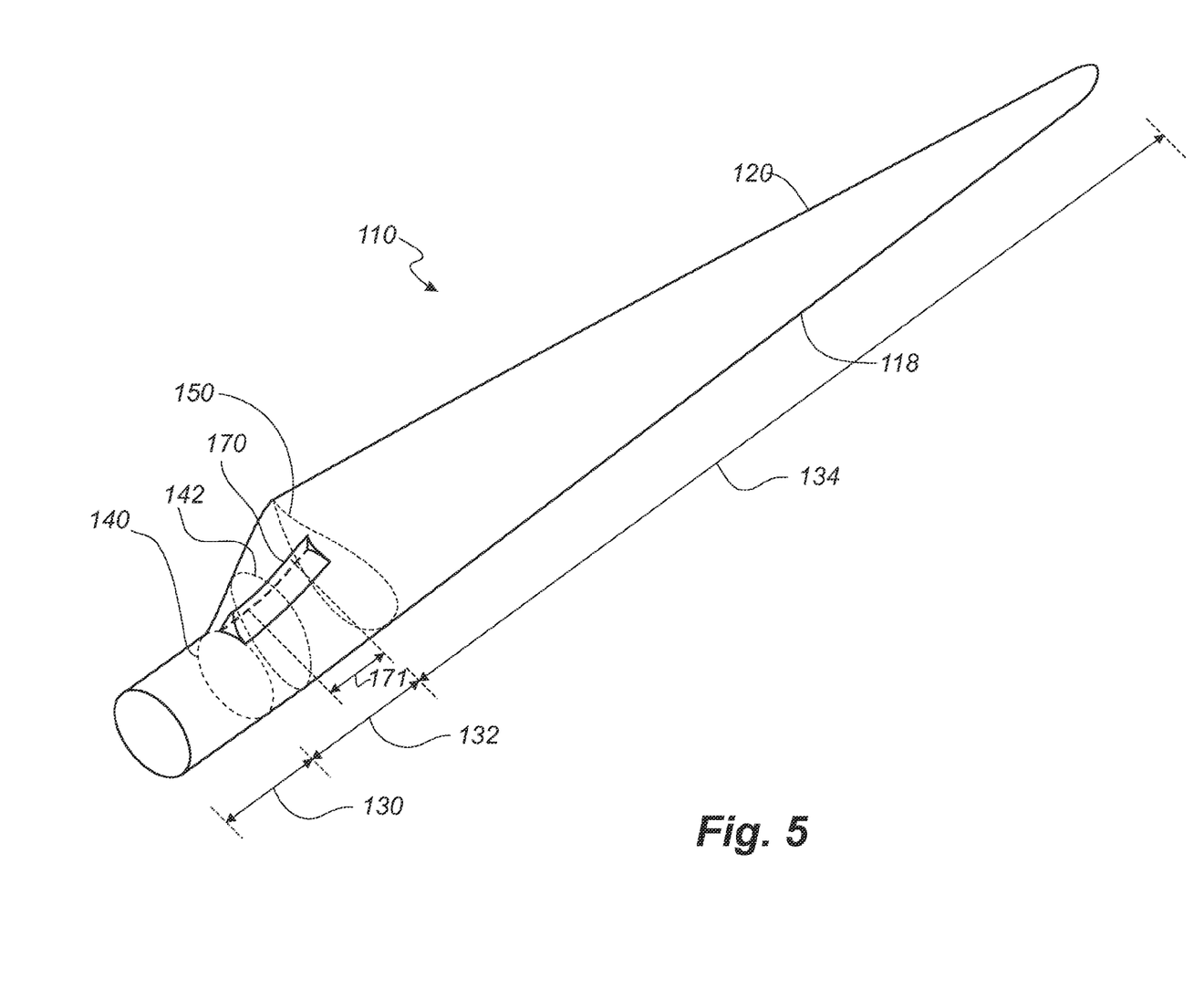
FIG. 5 shows a schematic view of a second embodiment of a wind turbine blade provided with a flow guiding device according to the invention.
Figure 6:
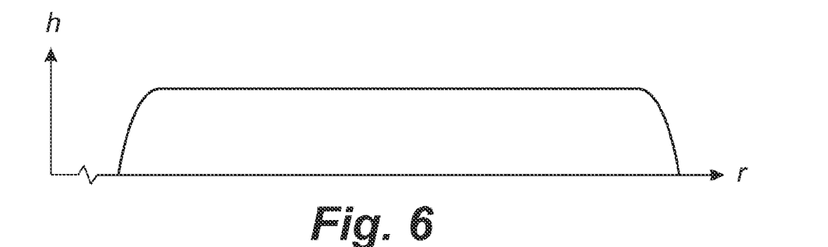
FIG. 6 shows a rear edge height of a first flow guiding device according to the invention as a function of the radial distance from the hub.

FIG. 5 shows a second embodiment of a blade 110 according to the invention, in which like numerals refer to like parts of the first embodiment shown in FIG. 2. Therefore, only the differences between the two embodiments are described. The second embodiment differs in that the height of the rear edge 184 of the flow guiding device 170 is substantially constant in the longitudinal direction of the blade, at least within the central portion 171. This is also shown in FIG. 6. As shown in FIG. 6, the flow guiding device 170 can be rounded or tapered near the longitudinal ends of the flow guiding device 170 in order to obtain a smooth transition to the profiled contour of the blade.

Figure 8:
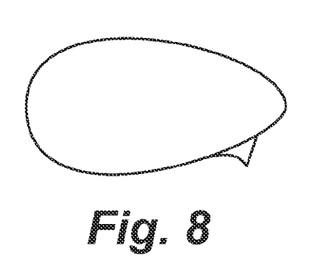
FIG. 8 shows a first rear edge shape for a flow guiding device according to the invention.
Figure 9:
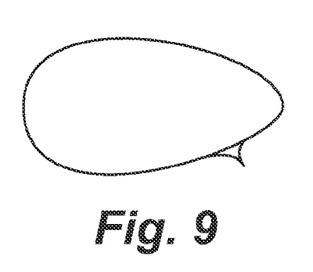
FIG. 9 shows a second rear edge shape for a flow guiding device according to the invention.
Figure 10:
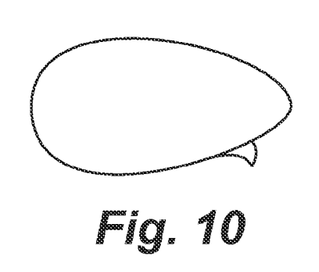
FIG. 10 shows a third rear edge shape for a flow guiding device according to the invention.

The shape of the rear edge 84, 184 of the flow guiding device 70, 170 may have various shapes. The rear edge may for instance be pointing backwards towards the trailing edge of the blade as shown in FIG. 8, be oriented substantially transverse to the chord as shown in FIG. 4, or be pointing forwards towards the leading edge of the blade (not shown). The rear edge may be either straight as shown in FIG. 8, concave as shown in FIG. 9, or convex as shown in FIG. 10.

The flow guiding device 70, 170 according to the invention must be designed so that the angle a is at least 45 degrees for each transverse cross-section within the central portion 71, 171 of the flow guiding device 70, 170. Furthermore, the flow guiding device 70, 170 is arranged at a position so as to generate a separation of airflow along at least a central longitudinal portion 71, 171 of the flow guiding device 70, 170 from the pressure side of the blade at a point between the flow guiding device 70, 170 and the trailing edge 20, 120 of the blade 10, 110, when the blade 10, 110 is impacted by the incident airflow. Near the longitudinal ends of the flow guiding device 70, 170 design variances may fall outside these design parameters. Preferably, the central portion 71, 171 of the flow guiding device extends along at least 80% of the longitudinal extent of the flow guiding device 70, 170.

Figure 11:
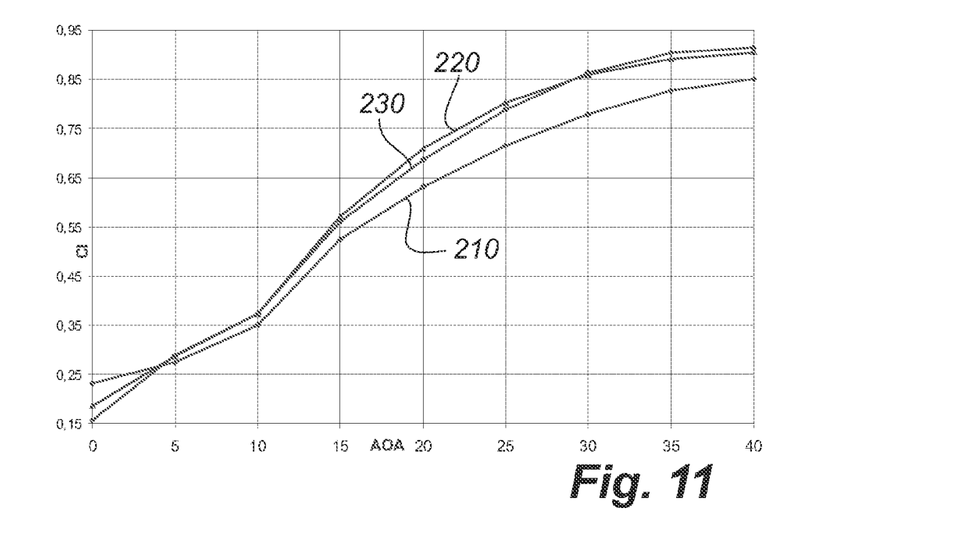
FIG. 11 shows graphs of the lift coefficient as a function of the angle of attack for an incident airflow.
Figure 12:
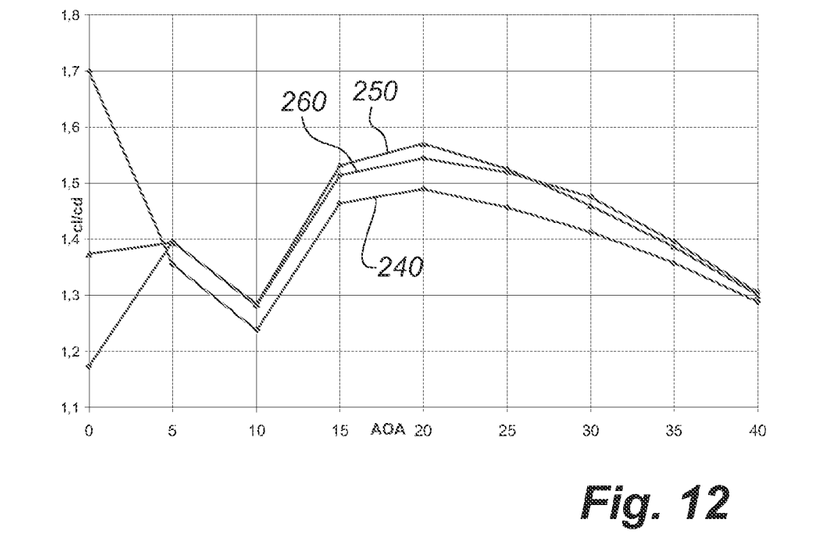
FIG. 12 shows graphs of the lift-to-drag ratio as a function of the angle of attack for an incident airflow.

FIG. 11 and FIG. 12 show graphs of the lift coefficients $c_l$ and the lift-to-drag ratio $c_l/c_d$, respectively, as a function of the angle of attack AOA for various angles a and for a constant rear edge height of the flow guiding device. The particular profile, which has been examined in these measurements, is designed for operation with an angle of attack AOA falling within approximately 15 to 20 to degrees. Furthermore, the inflow surface is substantially straight.

In FIG. 11, the first graph 210 depicts the lift coefficient $c_l$ as a function of the angle of attack AOA for a=25 degrees, the second graph 220 depicts the lift coefficient $c_l$ as a function of the angle of attack AOA for a=65 degrees, and the third graph 230 depicts the lift coefficient $c_l$ as a function of the angle of attack AOA for a=85 degrees. It can be seen that the lift coefficient is increased significantly within the design AOA. The lift coefficient for a=85 degrees is for instance 10-12% higher than for a=25 degrees.

In FIG. 12, the first graph 240 depicts the lift-to-drag ratio $c_l/c_d$ as a function of the angle of attack AOA for a=25 degrees, the second graph 250 depicts the lift-to-drag ratio $c_l/c_d$ as a function of the angle of attack AOA for a=65 degrees, and the third graph 260 depicts the lift-to-drag ratio $c_l/c_d$ as a function of the angle of attack AOA for a=85 degrees. It can be seen that the lift-to-drag ratio is increased significantly within the design AOA. The lift coefficient for a=85 degrees is for instance approximately 5% higher than for a=25 degrees.

It should be noted that the second angle θ may be used as a supplemental or an alternative parameter for designing the flow guiding device. In this case, the second angle θ should be at least 25 degrees according to the invention. The graphs depicted in FIGS. 11 and 12 correspond to second angles θ of 0, 45 and 60 degrees, respectively. Since the inflow surface is straight, the second angle θ also corresponds to the angle between the end point tangent and the chord.

The invention has been described with reference to a preferred embodiment. However, the scope of the invention is not limited to the illustrated embodiment, and alterations and modifications can be carried out without deviating from the scope of the invention.

LIST OF REFERENCE NUMERALS 2 wind turbine
4 tower
6 nacelle
8 hub
10 blade
14 blade tip
16 blade root
18 leading edge
20 trailing edge
30 root region
32 transition region
34 airfoil region
40, 42, 50 profiled contour/profiles
44 chord
52 pressure side
54 suction side
56 leading edge
58 trailing edge
60 chord
62 camber line/median line
70 flow guiding device/spoiler
71 central longitudinal portion
72 inflow surface
74 start point
76 end point
78 profile tangent
80 end point tangent
82 crossing point
84 rear edge of flow guiding device
86 median line to the inflow surface
210-260 graphs
a angle between profile tangent and end point tangent
c chord length
$c_l$ lift coefficient
$c_l/c_d$ lift-to-drag ratio
$d_t$ position of maximum thickness
$d_f$ position of maximum camber
f camber
t thickness

The invention claimed is:

1. A blade (10) for a rotor of a wind turbine (2) having a substantially horizontal rotor shaft, said rotor comprising a hub (8), from which the blade (10) extends substantially in a radial direction when mounted to the hub (8), the blade having a longitudinal direction (r) with a tip end (16) and a root end (14) and a transverse direction, the blade further comprising:
a profiled contour (40, 42, 50) including a pressure side and a suction side, as well as a leading edge (18) and a trailing edge (20) with a chord having a chord length extending there between, the profiled contour, when being impacted by an incident airflow, generating a lift, wherein the profiled contour is divided into:
a root region (30) having a substantially circular or elliptical profile closest to the hub,
an airfoil region (34) having a lift-generating profile furthest away from the hub, and
a transition region (32) between the root region (30) and the airfoil region (34), the transition region (32) having a profile gradually changing in the radial direction from the circular or elliptical profile of the root region to the lift-generating profile of the airfoil region, and wherein
the blade is provided with a flow guiding device (70) added to the profiled contour (40, 42, 50) of the blade on the pressure side (52) of the blade (10), the flow guiding device (70) having an inflow surface (72) with a start point (74) oriented towards the leading edge (18) of the blade (10) and an end point (76) oriented towards the trailing edge (20) of the blade (10), the distance between the inflow surface (72) and the profiled contour (40, 42, 50) increasing from the start point (74) to the end point (76), and wherein
the flow guiding device (70) extends along at least a longitudinal part of the transition region (32) and is arranged so as to generate a separation of airflow along at least a central longitudinal portion (71) of the flow guiding device (70) from the pressure side (52) of the blade (10) at a point between the flow guiding device (70) and the trailing edge (20) of the blade (10), when the blade (10) is impacted by the incident airflow, the flow guiding device having a rear edge, with a rear edge height, wherein the rear edge height is substantially constant in at least a central longitudinal portion (71) of the flow guiding device (70), such that the central longitudinal portion (71) is at least 50% of the longitudinal extent of the flow guiding device (70) wherein
the inflow surface (72) in at least the central longitudinal portion (71) is formed so that, for each transverse cross-section, an end point tangent (80) to the inflow surface (72) at the end point (76) crosses the profiled contour (40, 42, 50) at a crossing point (82), where the profiled contour (40, 42, 50) has a profile tangent (78) to the profiled contour (40, 42, 50), and wherein an acute angle (a) between the profile tangent (78) and the end point tangent (80) is at least 45 degrees.

2. A blade according to claim 1, wherein the acute angle between the profile tangent (78) and the end point tangent (80) is at least 50 degrees.

3. A blade according to claim 1, wherein a median line to the inflow surface (72) forms a second angle (θ) with the chord (44), the second angle being at least 25 degrees.

4. A blade according to claim 1, wherein the flow guiding device (70) extends along substantially the entire longitudinal extent of the transition region (32).

5. A blade according to claim 1, wherein the inflow surface (72) is concave.

6. A blade according to claim 5, wherein a starting point tangent to the inflow surface at the starting point (74) is substantially parallel to a tangent to the profile at the starting point (74).

7. A blade according to claim 1, wherein the flow guiding device (70) is integrally formed with the blade (10).

8. A blade according to claim 1, wherein the flow guiding device (70) is fitted on the surface of the blade (10).

9. A blade according to claim 1, wherein the flow guiding device (70) extends into the root region (30).

10. A blade according to claim 1, wherein the flow rear edge height decreases in the longitudinal direction towards the tip end (14).

11. A blade according to claim 1, wherein the flow guiding device (70) has a rear edge (84) with a rear edge height (h), and the profiled contour (40, 42, 50) has a maximum thickness, and wherein the ratio between the rear edge height (h)

and the maximum thickness (t/c) in at least the central longitudinal portion lies in an interval between 3% and 25%.

12. A wind turbine comprising two blades according to claim 1.

13. A blade according to claim 1, wherein the acute angle between the profile tangent (78) and the end point tangent (80) is at least 55 degrees.

14. A blade according to claim 1, wherein the acute angle between the profile tangent (78) and the end point tangent (80) is at least 60 degrees.

15. A blade according to claim 1, wherein a median line to the inflow surface (72) forms a second angle (θ) with the chord (44), the second angle being at least 30 degrees.

16. A blade according to claim 1, wherein a median line to the inflow surface (72) forms a second angle (θ) with the chord (44), the second angle being at least 35 degrees.

17. A blade according to claim 1, wherein the central longitudinal portion (71) is at least 60% of the longitudinal extent of the flow guiding device (70).

18. A blade according to claim 1, wherein the central longitudinal portion (71) is at least 70% of the longitudinal extent of the flow guiding device (70).

19. A blade according to claim 1, wherein the central longitudinal portion (71) is at least 80% of the longitudinal extent of the flow guiding device (70).

20. A blade according to claim 1, wherein the central longitudinal portion (71) is at least 90% of the longitudinal extent of the flow guiding device (70).

21. A blade according to claim 1, wherein the flow guiding device (70) has a rear edge (84) with a rear edge height (h), and the profiled contour (40, 42, 50) has a maximum thickness, and wherein the ratio between the rear edge height (h) and the maximum thickness (t/c) in at least the central longitudinal portion lies in an interval between 3% and 20%.

22. A wind turbine comprising three blades according to claim 1.

* * * * *